Feb. 28, 1928.
C. PEARSON
1,660,454
AUTOMATIC REVERSIBLE FOOT LEVER LIFT FOR MOWERS
Filed May 14, 1920 3 Sheets-Sheet 1
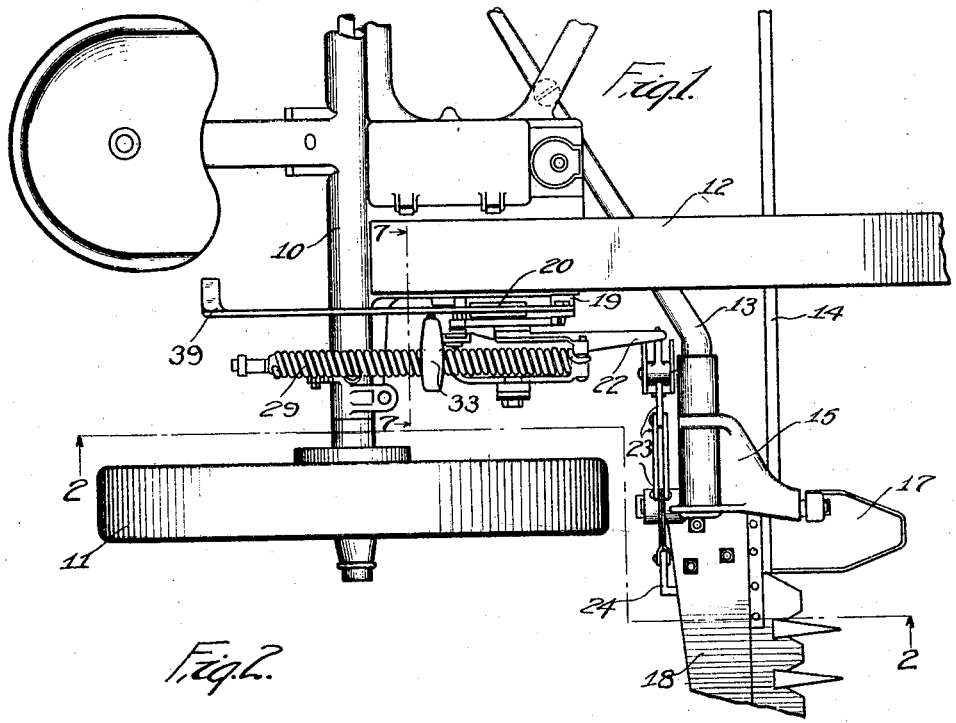
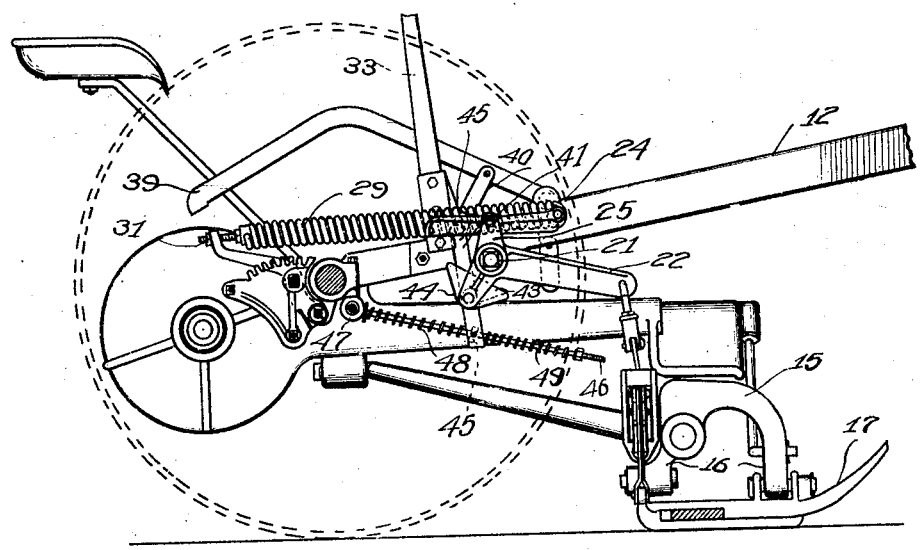
Inventor:
Charles Pearson
By John P. Smith
Atty.

Inventor:
Charles Pearson
By John P. Smith
Atty.

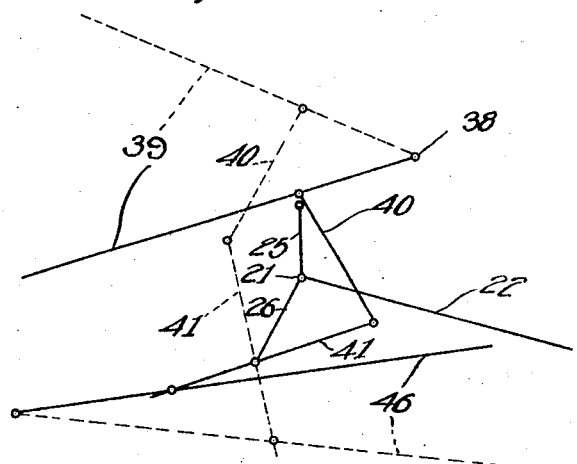
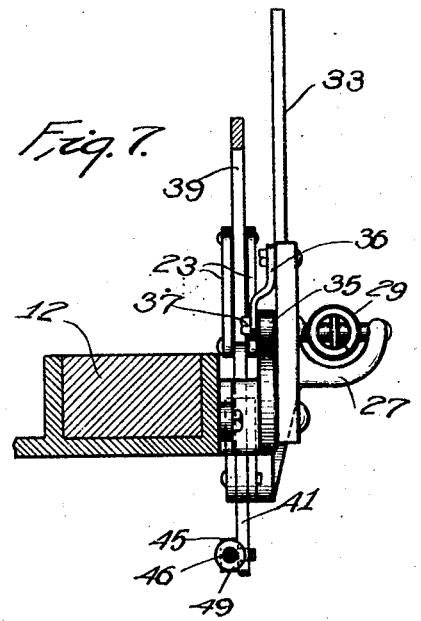
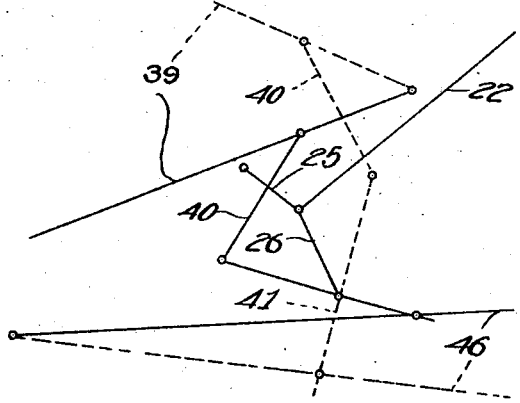
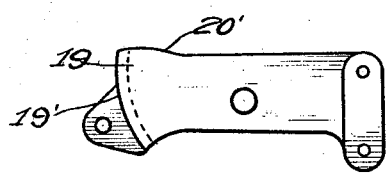
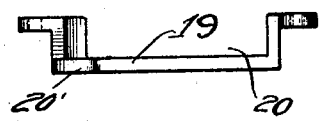

Patented Feb. 28, 1928.

1,660,454

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

AUTOMATIC REVERSIBLE FOOT-LEVER LIFT FOR MOWERS.

Application filed May 14, 1920. Serial No. 381,434.

This invention relates to improvements in mowing machines and more particularly to the mechanism for raising and lowering the cutting bar in an improved manner.

One of the objects of this invention is to provide an improved lever mechanism for raising and lowering the cutting bar.

A further object is to provide an automatic reversible lever mechanism.

A further object is to employ the movement of the lever in one direction to effect the raising or lowering of the cutter bar.

A still further object is to provide a novel means for relieving the tension on the balancing spring.

These and other objects are obtained by providing an improved lever mechanism operatively connected to the cutter bar. More specifically stated, the invention in the present instance comprises a reversible mechanism, such for instance as a toggle link connection between said lever and lifting mechanism. The invention consists in general of certain novel details of construction and combination of parts hereinafter fully described, illustrated in the accompanying drawings and specifically claimed.

In the accompanying drawings, like characters of reference indicate like parts throughout the several views, and Figure 1 is a top plan view of a part of a mower embodying my invention;

Fig. 2 is a vertical sectional view taken on the lines 2—2 in Fig. 1 looking in the direction of the arrows;

Figs. 5 and 6 are diagrammatic views corresponding to Figs. 3 and 4 respectively showing the different positions of the toggle link connections;

Fig. 7 is a detail sectional view taken on the lines 7—7 in Fig. 1 looking in the direction of the arrow, and Figs. 8 and 9 are enlarged detail views showing the cam bracket which supports the lever mechanism.

Figure 3:
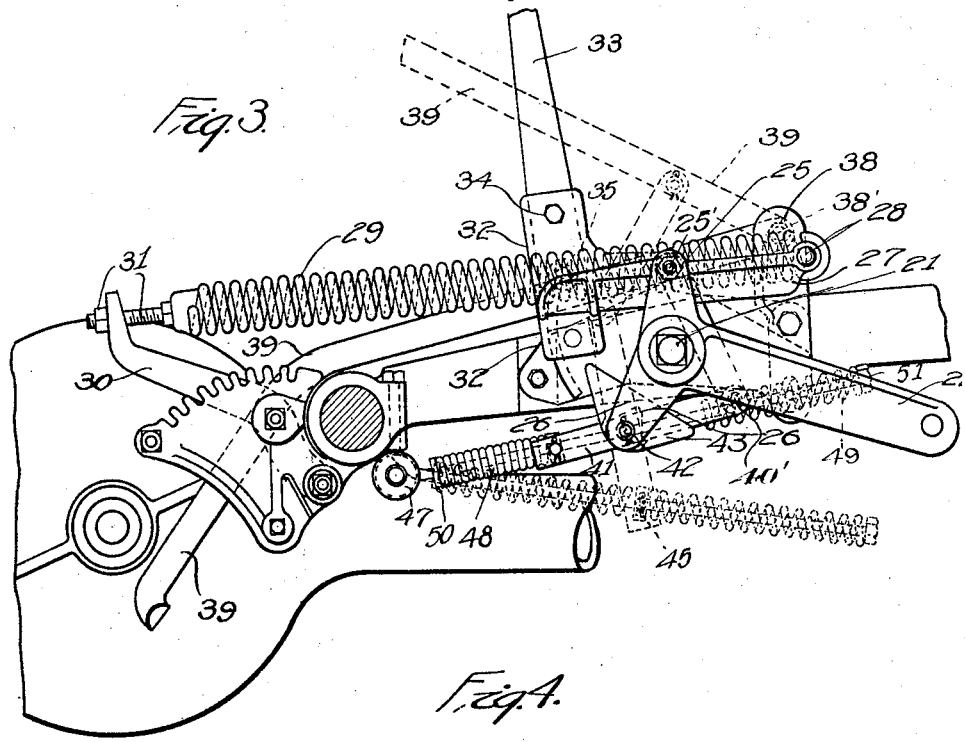
Fig. 3 is an enlarged detail view showing the position of the different parts when the mower bar has been lowered to operative position.

The mowing machine shown comprises, when broadly considered, a wheel frame 10 mounted on carrying wheels 11 having a draft tongue 12 and a coupling bar 13, a supplemental coupling member 14, a rocking coupling yoke 15 carried by the grassward end of the main coupling bar and having depending arms 16 whereby it is pivotally connected to the shoe 17 and a finger bar 18 secured to said shoe. The frame 10 has securely fixed adjacent one side of the tongue a cam bracket 19 having a recess 20 for the purposes hereinafter set forth.

Pivotally mounted on the bracket member 19 by means of a bolt 21 is a lifting arm 22. This lifting arm is connected to the cutter bar 18 by means of a common form of links 23 and lever extension 24. The lifting arm 22 is further provided with two oppositely disposed upper and lower supplemental arms 25 and 26. Pivotally mounted at 25′ on the supplemental arm 25 intermediate its ends is a curved bracket 27, (see Fig. 7) the forward end of this bracket being connected by means of a bolt 28 to the usual balancing spring 29, which is connected at its rear end to the frame 10 by a member 30 and adjustable connection 31. The rear end of the bracket 27 is provided with a socket 32 formed integrally therewith for the reception of a lever 33 secured thereto by means of bolts 34.

The lever 33 is provided on its stubbleward side with a roller 35 (see Fig. 7), held in position by a clip 36 and bolt 37. This roller engages the surface of the cam bracket in the operation of the hand lever 33 for the purposes hereinafter more fully set forth.

The mechanism which reverses the operation of the lifting lever will next be described:

Securely fixed by means of bolts to the grassward side of the tongue 12 is an upright member 38 having a pivot at 38′ for a foot lever 39 which extends rearwardly within reach of the operator. The lever 39 has pivotally connected thereto a link 40 which in turn is connected to a lower link 41 forming the toggle connection between the foot lever 39 and lifting arm 22. This toggle link connection, it will be noted, passes through the recess 20 in the cam bracket 19. The lower link 41 is pivoted intermediate its ends to the lower supplemental arm 26 and is limited in its movements by a V-shaped member 43 fixed to the arm 26. The V-shaped member is provided with oppositely disposed ribs 44 which engage the sides of the link 41 and thereby limit the movement of the link with respect to the arm 26. The lower end of this link is provided with a swiveling ring 45 which is adapted to receive the rod 46 pivotally connected at its rearward end to the frame 10 by means of an eye-bolt 47.

In connection with my invention, I have provided a foot lever mechanism which can be operated in one direction to effect a raising or lowering of the cutter bar. This includes an automatic reversible mechanism comprising a toggle link connection between the foot lever and the lifting arm.

The means for automatically reversing the position of the toggle link comprises two oppositely disposed springs 48 and 49 held in position on the rod 46 by a washer 50 and nut 51. These springs engage the swiveling ring 45 and normally hold the lower end of the link 41 centrally with respect to said rod, as shown in Fig. 2, and in dotted lines in Figs. 3 and 4.

Figure 4:
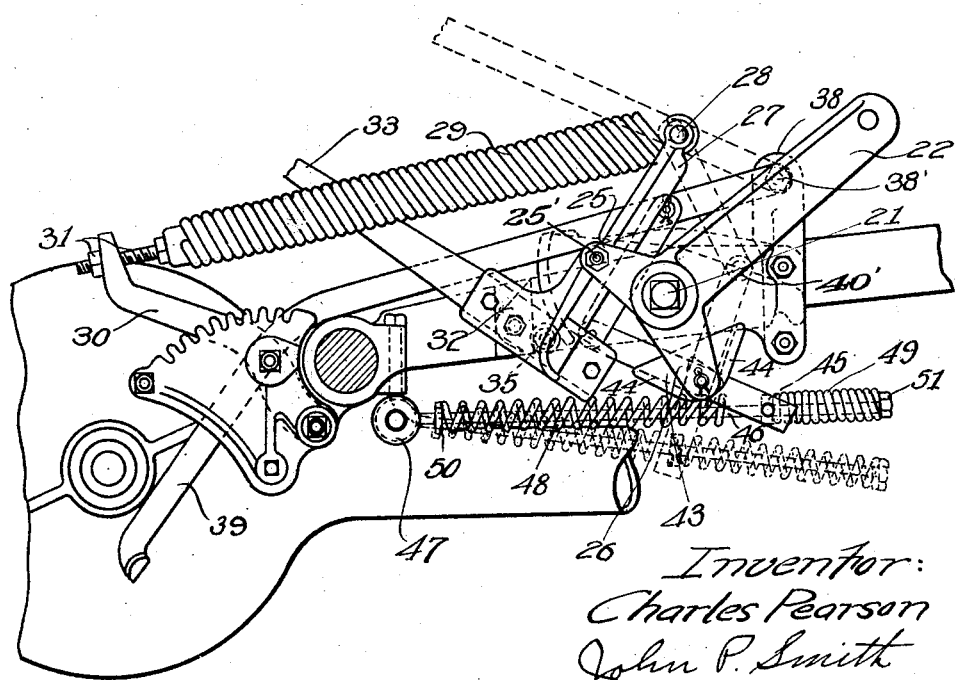
Fig. 4 is an enlarged detail view showing the position of the different parts when the mower bar has been raised to vertical or inoperative position.

The means for locking the cutter bar in a vertical position and for releasing the tension on the balancing spring will next be described:

When the foot lever 39 is depressed from the position shown in Fig. 2 to the full line position shown in Fig. 4, the lifting arm 22 is raised by means of the toggle link connection 40—41 between said foot lever and the arm 26. As this lifting arm 22 is raised, the supplemental arm 25 formed integrally therewith is moved about its center 21 and carries with it the spring bracket 27. This bracket 27 pivoted at 25' moves rearwardly in a horizontal direction until the roller 35 which is carried by the bracket 27 has reached the downwardly curved cam surface 19' on the bracket 19, at which time the hand lever 33 with the bracket 27 is swung rearwardly to the position shown in Fig. 4, thereby releasing the tension on the balancing spring 29 and frictionally locking the cutter bar in a raised position.

A brief description of the operation of the above described construction will now be given:

When the operator desires to raise the cutter bar from normal cutting position to the inoperative or vertical position, the foot lever 39 is depressed from the position shown in Fig. 2 to the full line position shown in Fig. 4. It will be noted from the position shown in Fig. 2 that the springs 48 and 49 normally retain the lower end of link 41 centrally on the rod 46 thereby causing the center pivot 40' of the toggle link 40—41 to take the position to the rear of the pivot 21 of the lifting arm 22.

As the foot lever 39 is depressed, the cutter bar is raised to vertical position through the connections 40—41, 26 and lifting arm 22. When the cutter bar has been raised to vertical position these parts assume the position shown in Fig. 4. That is, the roller 35 has reached the lower end of the cam surface 19' swinging the hand lever 33 rearwardly and causing the bracket 27 to swing about its pivot 25' thereby releasing the tension on the balancing spring 29 and locking the cutter bar in a vertical or elevated position.

It will be further noted that while the foot lever 39 is held depressed, the spring 49 on the rod 46 is compressed by reason of the link 41 swinging rearwardly. When this pressure is released on the foot lever 39, the spring 49 forces the lower end of the link 41 about its pivot 42 on the arm 26 to the position shown in dotted lines in Fig. 4. As is shown in the dotted lines in this Figure, the toggle link 40—41 with its pivot 40' is positioned forward of the pivot 21 of the lifting arm 22 and the foot lever 39 is raised in a position to be depressed for the next operation of lowering the cutter bar as shown in the dotted lines Fig. 4.

It will now be seen from Fig. 4 with the cutter-bar raised and the pressure relieved on the foot lever 39 that the parts shown in dotted line (i. e. lever 39, toggle 40—41, spring 48—49, and rod 46) will automatically assume these positions by reason of the spring 49 forcing the link 41 centrally on the rod 46. In this connection it will also be noted that the device may be made manually reversible by extending a connection from the toggle link to within reach of the operator's seat.

If the operator desires to lower the cutter-bar to operative position, the foot lever 39 is depressed from the dotted line position shown in Fig. 4 to the full line position shown in Fig. 3. It will be noted that the toggle link 40—41 as shown in the dotted lines in Fig. 4 is forward of the pivotal center 21 of the lifting arm 22 and the link 41 is limited in its movement about the pivot 42 by the stop 44 on the V-shaped member 43 and for this reason a pressure on the foot-lever 39 will force, through these connections, the link 40 downwardly about the pivot 21, thereby lowering the arm 22 from the position in Fig. 4 to the position in Fig. 3.

As the arm 22 is lowered, the supplemental arm 25 is raised and carries with it the bracket 27 and hand lever 33, which in turn carries the roller 35. This roller 35 rides over the cam surface 19′ until it engages the upper surface 20′ of the cam bracket 19, thereby locking the spring bracket 27 against pivotal action about the center 25 and bringing the balancing spring 29 into effectiveness when the cutter bar 18 has reached its operative position. It will be understood from the above description that when the cutter bar of the mower has been raised to its vertical or elevated position, that is, when the arm 22 is in the position shown in Fig. 4, the spring 29 balances the weight of the cutter bar and retains the bracket 27 with its lever 33 fixed thereto in the position shown in this figure. From this position the bracket 27 and the lever 33 are returned to the normal position, or to that position shown in Fig. 3, by overcoming this balance in the manner above described.

In order to more clearly understand the operation of the above described device, two diagrammatic views, Figs. 5 and 6 are shown which correspond to Figs. 3 and 4 respectively. The dotted lines in Figs. 5 and 6 indicate the normal position of the lever 39, toggle link 40—41 and rod 46 with the arm in a lowered position (Fig. 5) and in a raised position (Fig. 6).

It will be seen from these views that the toggle link 40—41 automatically takes a position to the rear of the pivot 21 when the lifting arm is lowered (Fig. 5) and automatically takes the position forward of the pivot 21 when the lifting arm is raised (Fig. 6).

In this invention I have shown and described but one embodiment. It is to be understood that the invention is capable of modifications. Modification, therefore, in the construction and arrangement of parts may be made without departing from the spirit and scope of the invention as expressed in the following claims.

I claim:

1. In a mower, a frame, a cutting mechanism pivotally connected to said frame, a lifting mechanism for said cutting mechanism, a manually operable lever for operating said lifting mechanism, and a toggle link for reversing the operating effect of said lever.

2. In a mower, a frame, a cutting mechanism pivotally connected to said frame, a lifting mechanism for said cutting mechanism, a manually operable lever for operating said lifting mechanism, and a toggle link for automatically reversing the operating effect of said lever.

3. In a mower, a frame, a cutting mechanism, a lifting arm pivoted to said frame and connected to said cutting mechanism, a lever pivoted to said frame, means comprising a toggle link connecting said lever with said lifting arm, and means comprising two oppositely disposed springs for normally retaining said lever in a raised position.

4. In a mower, a frame, a cutting mechanism, a lifting arm pivoted to said frame and connected to said cutting mechanism, a lever pivoted to said frame, a toggle link pivotally mounted on said lifting arm and connected to said lever, and means for limiting the movement of said link relative to said arm.

5. In a mower, a frame, a cutting mechanism, a lifting arm pivoted to said frame and connected to said cutting mechanism, a lever pivoted to said frame, and a toggle link connected to said lever and carried by said lifting arm operable forwardly and rearwardly of the pivot of said lifting arm for reversing the operating effect of said lever.

6. In a mower, a frame, a cutting mechanism, a lifting arm pivoted to said frame and connected to said cutting mechanism, a lever pivoted to said frame, and a toggle link connected to said lever and carried by said lifting arm, said toggle link being operable forwardly and rearwardly of the pivot of said lifting arm for normally retaining said lever in a raised position.

7. In a mower, a frame, a cutting mechanism pivotally connected to said frame, a lifting arm pivoted to said frame, a bracket carried by said lifting arm, a balancing spring mounted in said bracket and connected to said frame, and means comprising a roller and cam bracket for locking said cutting mechanism in a predetermined position of adjustment.

8. In a mower, a frame, a cutting mechanism, a lifting arm pivoted to said frame and connected to said cutting mechanism, a lever pivoted to said frame, and means comprising a toggle link connecting said lever with said lifting arm for automatically reversing the operating effect of said lever.

9. In a mower, a frame, a cutting mechanism, a lifting arm pivoted to said frame and connected to said cutting mechanism, a lever pivoted to said frame, means comprising a toggle link connecting said lever with said lifting arm, and means for normally retaining said lever in a raised position.

10. In a mower, a frame, a cutting mechanism, a lifting mechanism for said cutting mechanism, a lever carried by said frame and operatively connected to said lifting mechanism, and means including a toggle link mechanism for normally raising said lever and automatically reversing the operating effect of said lever.

11. In a mower, a frame, a cutting mechanism, a lifting mechanism for said cutting mechanism, a lever carried by said frame and operatively connected to said lifting mechanism, a toggle link mechanism carried by said lifting mechanism, and means for controlling the position of said toggle link mechanism with respect to said lifting mechanism.

12. In a mower, a frame, a cutting mechanism, a lifting mechanism for said cutting mechanism, a lever carried by said frame and operatively connected to said lifting mechanism, a toggle link mechanism carried by said lifting mechanism, and means including a connection pivoted to said frame and connected to said toggle link for controlling the position of said toggle link mechanism with respect to said lifting mechanism.

In testimony whereof I affix my signature.

CHARLES PEARSON.